United States Patent [19]

Fornuto et al.

[11] Patent Number: 4,792,114
[45] Date of Patent: Dec. 20, 1988

[54] VACUUM REGULATOR VALVE UNIT

[75] Inventors: Joseph Fornuto, Rochester; James R. Gaffney, Penfield; Thaddeus J. Grey, Rochester, all of N.Y.

[73] Assignee: General Motors Corporation, Detroit, Mich.

[21] Appl. No.: 83,754

[22] Filed: Aug. 7, 1987

[51] Int. Cl.$^4$ ............................................. F16K 31/06
[52] U.S. Cl. ........................... 251/129.16; 251/129.15; 251/86
[58] Field of Search ................. 251/129.16, 86, 129.15

[56] References Cited

U.S. PATENT DOCUMENTS 3,422,850  1/1969  Caldwell ..................... 251/129.16 X

*Primary Examiner*—Arnold Rosenthal
*Attorney, Agent, or Firm*—C. K. Veenstra

[57] ABSTRACT

A vacuum regulator valve unit has a valve body and a coil assembly that define a chamber. The valve body has an air inlet passage opening into the chamber. A washer overlies the valve body within the chamber and has an air inlet port aligned with the passage and a valve seat surrounding the port. The coil assembly supports a shaft projecting into the chamber. A valve member is mounted loosely on the shaft within the chamber and slides on the shaft into and out of engagement with the valve seat in response to energization and deenergization of the coil. The valve body has a peripheral annular ledge that cambers the washer to assure full engagement of the washer with the valve body at the perimeter of the port. The shaft has an undercut taper that articulates the valve member to allow the valve member to align with the valve set and thereby assure full engagement of the valve member with the valve seat.

3 Claims, 2 Drawing Sheets

VACUUM REGULATOR VALVE UNIT

TECHNICAL FIELD

This invention relates to a solenoid operated valve unit that may be used to regulate the vacuum in a vacuum operated exhaust gas recirculation valve assembly.

BACKGROUND AND SUMMARY OF THE INVENTION

Automotive engines include a system for recirculating exhaust gases from the engine exhaust system to the engine combustion chambers. The recirculated exhaust gases mix with the air and fuel delivered to the combustion chambers and inhibit the formation of nitrogen oxides during the combustion process.

A conventional exhaust gas recirculation (EGR) system includes a vacuum operated EGR valve assembly that controls the flow of exhaust gases to the combustion chambers. In some EGR systems, a solenoid operated valve unit is used to regulate the vacuum and thereby allow electronic control over the flow of recirculated exhaust gases.

This invention provides a solenoid operated vacuum regulator valve unit that assures repeatable operation when used to regulate the vacuum in a vacuum operated EGR valve assembly.

In this vacuum regulator valve unit, a cylindrical valve member is mounted loosely on a shaft and slides into and out of engagement with a valve seat that surrounds an air inlet port. When the valve member is engaged with the valve seat, it interrupts air flow through the port to allow an increase in the vacuum (a decrease in the pressure) that operates the EGR valve assembly. When the valve member is disengaged from the valve seat, air flows through the port to decrease the vacuum (increase the pressure) that operates the EGR valve assembly.

The valve seat is formed by a thin washer supported on a valve body, and the air inlet port opens through the washer to an air inlet passage in the valve body. To assure repeatable operation of the vacuum regulator valve unit, we have found that the washer must fully engage the valve body at the perimeter of the air inlet port. This invention provides a vacuum regulator valve unit having a valve body constructed to camber the washer and thereby assure that the washer does fully engage the valve body at the perimeter of the air inlet port.

Moreover, we have found that to assure repeatable operation of the vacuum regulator valve unit, the valve member must fully engage the valve seat. This invention provides a vacuum regulator valve unit having a shaft constructed with an undercut taper to articulate the valve member and thereby assure that the valve member does fully engage the valve seat.

The details as well as other features and advantages of the preferred embodiments of this invention are set forth in the remainder of the specification and are shown in the drawings.

THE PREFERRED EMBODIMENTS

Figure 1:
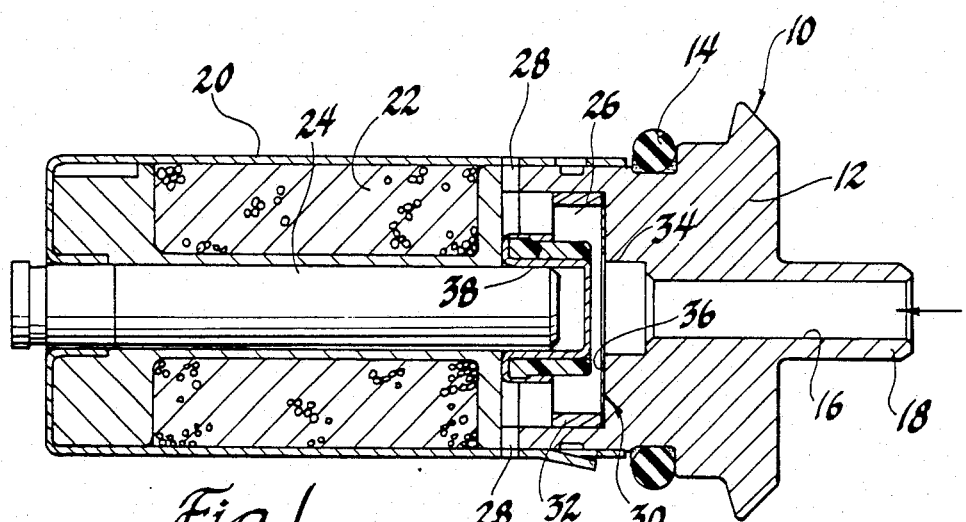
FIG. 1 is a sectional view of a vacuum regulator valve unit in which this invention may be employed.

Referring first to FIG. 1, a vacuum regulator valve unit 10 has a valve body 12 adapted to be received in an opening in the cover of an EGR valve assembly. Valve body 12 carries an O-ring 14 to seal the opening in the EGR valve cover. Valve body 12 has an air inlet passage 16 extending through a fitting 18 that projects outside the EGR valve cover and is adapted for connection to a source of clean air.

A housing 20 is staked to valve body 12 and surrounds a coil assembly 22 that supports a shaft 24. Shaft 24 projects into a chamber 26 defined between valve body 12 and coil assembly 22. Housing 20 and coil assembly 22 are constructed to provide openings 28 from chamber 26 to the interior of the EGR valve cover.

Within chamber 26, a washer 30 is held against valve body 12 by a brass retainer ring 32. Washer 30 has an air inlet port 34 aligned with air inlet passage 16, and defines a valve seat 36 surrounding port 34. A valve member 38 is loosely mounted on shaft 24 to slide into and out of engagement with valve seat 36. When coil assembly 22 is energized, the magnetic flux slides valve member 38 into engagement with valve seat 36; valve member 38 thereby interrupts air flow through port 34, chamber 26 and opening 28 to allow an increase in the vacuum (a decrease in the pressure) within the EGR valve cover. When coil assembly 22 is not energized, the difference between the subatmospheric pressure in chamber 26 and the atmospheric pressure in air inlet passage 16 slides valve member 38 out of engagement with valve seat 36; air then flows through port 34, chamber 26 and opening 28 to decrease the vacuum (increase the pressure) within the EGR valve cover.

Figure 2:
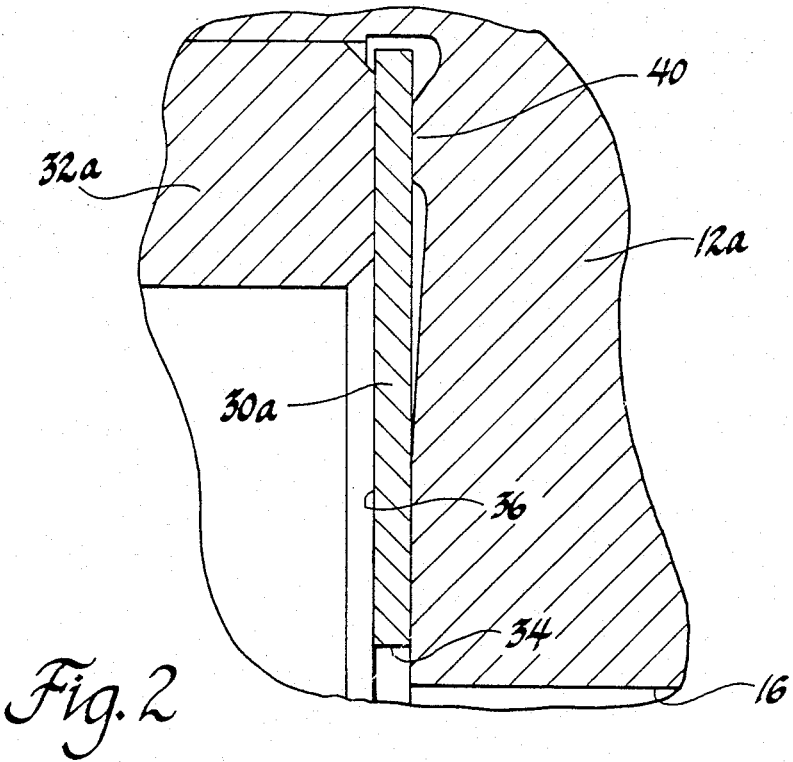
FIG. 2 is an enlarged sectional view of a portion of a vacuum regulator valve unit employing a preferred embodiment of the first aspect of this invention, showing an annular ledge on the valve body that cambers the washer to assure full engagement of the washer with the valve body at the perimeter of the air inlet port.

FIG. 2 shows a modification of the vacuum regulator valve unit 10 that assures full engagement of the washer with the valve body at the perimeter of the air inlet port. Referring to FIG. 2, a brass retainer ring 32a holds a washer 30a against a peripheral annular ledge 40 formed on valve body 12a. Ledge 40 cambers washer 30a to assure full engagement of washer 30a with valve body 12a at the perimeter of air inlet port 34.

Figure 3:
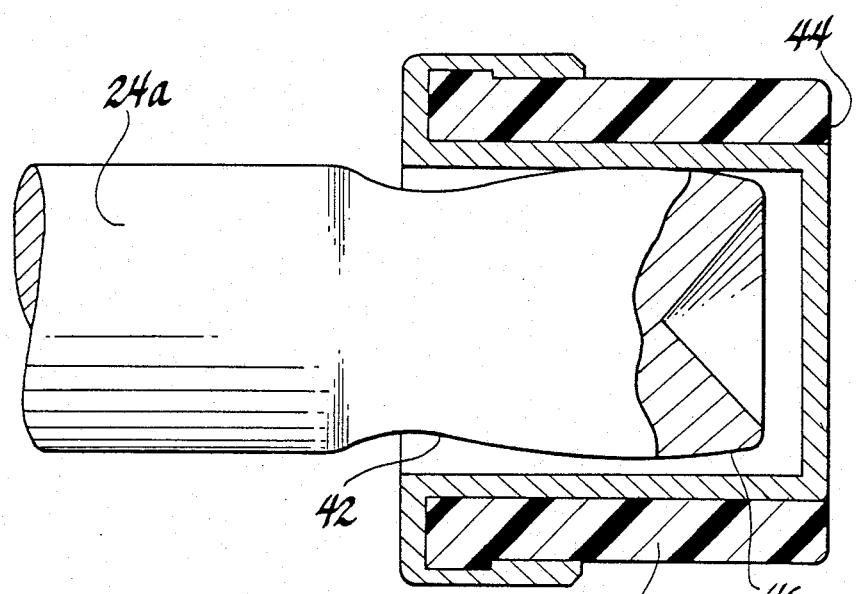
FIG. 3 is an enlarged sectional view of another portion of a vacuum regulator valve unit employing one embodiment of the second aspect of this invention, showing a shaft with a spherically undercut taper that articulates the valve member to assure full engagement of the valve member with the valve seat.

FIG. 3 shows a modification of the vacuum regulator valve unit 10 that assures full engagement of the valve member with the valve seat. Referring to FIG. 3, a shaft 24a has a spherically undercut taper 42 that articulates the valve member 38, allowing the flat end 44 of valve member 38 to align with the valve seat 36 and thereby assuring full engagement of valve member 38 with valve seat 36. In this embodiment, the end 46 of shaft 24a also is spherically tapered.

Figure 4:
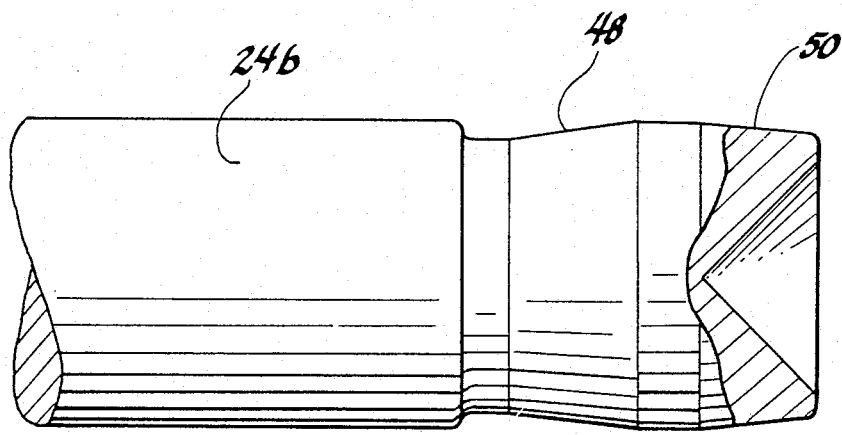
FIG. 4 is an enlarged sectional view of a portion of a vacuum regulator valve unit employing another embodiment of the second aspect of this invention, showing a shaft with a conically undercut taper that articulates the valve member to assure full engagement of the valve member with the valve seat.

FIG. 4 shows another modification of the vacuum regulator valve unit 10 that assures full engagement of the valve member with the valve seat. Referring to FIG. 4, a shaft 24b has a conically undercut taper 48 that articulates the valve member 38, allowing the flat end 44 of valve member 38 to align with the valve seat 36 and thereby assuring full engagement of valve member 38 with valve seat 36. In this embodiment, the end 50 of shaft 24b also is conically tapered.

The embodiments of the invention in which an exclusive property or privilege is claimed are defined as follows:

1. A vacuum regulator valve unit comprising a valve body and a coil assembly defining a camber, said valve body having an air inlet passage opening into said chamber, a washer overlying said valve body within said chamber, said washer having an air inlet port aligned with said passage and defining a valve seat surrounding said port, said coil assembly supporting a shaft projecting into said chamber, a valve member mounted loosely on said shaft within said chamber, said valve member sliding on said shaft into and out of engagement with said valve seat in response to energization and deenergization of said coil assembly, and wherein said valve body has a peripheral annular ledge that cambers said washer to assure full engagement of said washer with said valve body at the perimeter of said port.

2. A vacuum regulator valve unit comprising a valve body and a coil assembly defining a chamber, said valve body having an air inlet passage opening into said chamber and said unit including an air inlet port aligned with said passage and a valve seat surrounding said port, said coil assembly supporting a shaft projecting into said chamber, a valve member mounted loosely on said shaft within said chamber, said valve member sliding on said shaft into and out of engagement with said valve seat in response to energization and deenergization of said coil assembly, and wherein said shaft has an undercut taper that articulates said valve member to allow said valve member to align with said valve seat and thereby assure full engagement of said valve member with said valve seat.

3. A vacuum regulator valve unit comprising a valve body and a coil assembly defining a chamber, said valve body having an air inlet passage opening into said chamber, a washer overlying said valve body within said chamber, said washer having an air inlet port aligned with said passage and defining a valve seat surrounding said port, said coil assembly supporting a shaft projecting into said chamber, a valve member mounted loosely on said shaft within said chamber, said valve member sliding on said shaft into and out of engagement with said valve seat in response to energization and deenergization of said coil assembly, wherein said valve body has a peripheral annular ledge that cambers said washer to assure full engagement of said washer with said valve body at the perimeter of said port, and wherein said shaft has an undercut taper that articulates said valve member to allow said valve member to align with said valve seat and thereby assure full engagement of said valve member with said valve seat.

* * * * *